(12) United States Patent
Momayezi

(10) Patent No.: US 9,817,135 B2
(45) Date of Patent: Nov. 14, 2017

(54) PERFORMANCE STABILIZATION FOR SCINTILLATOR-BASED RADIATION DETECTORS

(71) Applicant: BridgePort Instruments, LLC, Austin, TX (US)

(72) Inventor: Michael Momayezi, Austin, TX (US)

(73) Assignee: Bridgeport Instruments, LLC, Austin, TX (US)

( * ) Notice: Subject to any disclaimer, the term of this patent is extended or adjusted under 35 U.S.C. 154(b) by 0 days.

(21) Appl. No.: 15/121,648

(22) PCT Filed: Oct. 22, 2015

(86) PCT No.: PCT/US2015/056819
§ 371 (c)(1),
(2) Date: Aug. 25, 2016

(87) PCT Pub. No.: WO2016/065099
PCT Pub. Date: Apr. 28, 2016

(65) Prior Publication Data
US 2016/0363672 A1 Dec. 15, 2016

Related U.S. Application Data

(60) Provisional application No. 62/067,769, filed on Oct. 23, 2014.

(51) Int. Cl.
*G01T 1/20* (2006.01)
*G01T 1/208* (2006.01)

(52) U.S. Cl.
CPC ............ *G01T 1/208* (2013.01); *G01T 1/2018* (2013.01)

(58) Field of Classification Search
CPC .............. G01T 1/171; G01T 1/17; G01T 1/00
See application file for complete search history.

(56) References Cited

U.S. PATENT DOCUMENTS

| | | | | |
|---|---|---|---|---|
| 4,749,859 A * | 6/1988 | Schmidt | ................... | G01V 5/04 250/256 |
| 4,883,956 A * | 11/1989 | Melcher | ................ | G01T 1/2002 250/269.2 |
| 6,470,285 B1 * | 10/2002 | Atwell | .................... | G01T 1/171 702/189 |
| 2004/0017224 A1 * | 1/2004 | Tumer | .................... | H03F 3/087 327/51 |
| 2005/0269513 A1 | 12/2005 | Ianakiev et al. | | |
| 2007/0147702 A1 * | 6/2007 | Scoullar | .................. | G01T 1/171 382/276 |
| 2010/0001201 A1 | 1/2010 | Stein et al. | | |
| 2011/0031405 A1 | 2/2011 | Kulik et al. | | |
| 2011/0112810 A1 * | 5/2011 | Scoullar | .................. | G01T 1/171 703/2 |
| 2011/0147594 A1 * | 6/2011 | Scoullar | ................ | A61B 6/037 250/362 |

(Continued)

FOREIGN PATENT DOCUMENTS

WO 2011006038 A2 1/2011

*Primary Examiner* — Kiho Kim
(74) *Attorney, Agent, or Firm* — Michael A. Ervin; M.A. Ervin & Associates

(57) ABSTRACT

A method for improving the measurement accuracy of scintillation based radiation detectors for ionizing radiation pulses when the multi-channel analyzer of the radiation detector is exposed to continuously varying temperatures.

10 Claims, 8 Drawing Sheets

(56) References Cited

U.S. PATENT DOCUMENTS

2011/0251828 A1* 10/2011 Scoullar .................. G01V 1/28
702/189
2013/0334408 A1 12/2013 Stolin et al.

* cited by examiner

PERFORMANCE STABILIZATION FOR SCINTILLATOR-BASED RADIATION DETECTORS

CROSS REFERENCE TO RELATED APPLICATIONS

This application claims the priority of previously filed U.S. provisional 62/067,769 filed Oct. 23, 2014.

BACKGROUND

Radiation detection devices are used in a variety of industrial, scientific, military, and government applications. Exemplary scintillator detectors have scintillator crystals made of activated sodium iodide or cesium iodide, or other materials that are effective for detecting gamma rays.

Generally, the scintillator crystals are enclosed in casings or sleeves that include a window to permit radiation-induced scintillation light to pass out of the crystal package. The light passes to a light-sensing device such as a photomultiplier tube (PMT), and the photomultiplier tube converts the light photons emitted from the crystal into electrical pulses. The electrical pulses are shaped and digitized by associated electronics and may be registered as counts that are transmitted to analyzing equipment.

Scintillators are used for nuclear and X-ray radiation detection. In response to a pulse of ionizing radiation they create a light flash. That light flash is recorded and analyzed by suitable instrumentation.

Existing instruments convert the light pulse into a concomitant electronic pulse. Analog instruments will transform the electronic pulse to create a new pulse shape with a pulse-height that is proportional to the integral over the original pulse. Digital instruments will attempt to perform a direct integration of the electronic pulse without applying that transformation.

The performance of both types of instruments degrades when the pulse shape of the scintillator light changes due to an external effect, such as a change in temperature.

Multichannel analyzers are affected by a change in pulse shape in three distinct ways.

First, there is a maximum electronic pulse height that can be processed by the electronics. It corresponds to the maximum radiation pulse energy (E_max). By the same token, there is a minimum electronic pulse height, corresponding to a minimal radiation pulse energy that can be detected (E_min). For practical applications it is mandatory to maintain a certain range of [E_min, E_max] over the entire range of measurement conditions, such as environmental temperature. If the pulse shapes change, E_min and E_max will be affected. For example, the pulses may lengthen even if the amount of light contained in the scintillator pulses does not change. In that case the resulting electronic pulses will have lower amplitudes, and small pulses that previously made it above the trigger threshold, will no longer be tall enough to trigger the data acquisition.

Traditional analog or digital MCA's (multichannel analyzers) measure deposited energies using a fixed shaping time (analog MCA) or a fixed integration time (digital MCA). Both devices rely on the pulse shape being constant, except for statistical electronic noise fluctuations around the average pulse shape. If the pulse shape changes due to an external parameter such as temperature, traditional MCAs will not measure energies as accurately as possible.

There is a second impact a changing pulse shape has on the accuracy of the energy measurement. In practice the shaping time or integration time is chosen such as to use about 90% of the light from the scintillation pulse for the measurement of the energy. Using less will deteriorate the precision of the measurement. If the scintillation pulses lengthen, for example due to a temperature change, they may become too long for the given operating parameters of the MCA. As a result, the MCA will measure energy values that are systematically smaller than the correct values. It will also lose accuracy of measurement (energy resolution) as it samples less than 90% of the scintillation light.

The third way in which the pulse shape changes affect the performance of the MCA has to do with pile up rejection. An MCA will typically implement a method to recognize a set of two or more pulses that occur too close together in time to be measured independently and precisely. This situation is referred to as a pile up. Clearly, any measure of "too close in time" must be related to how long the pulses are. Hence, if the pulses lengthen, the MCA performance may deteriorate as it either fails to recognize pile up or falsely rejects well-separated pulses as being piled-up. In both cases, the resulting energy histograms will be distorted and reported count rates may consistently be too low.

Advanced digital MCA's, as described here, can improve the accuracy of gamma-ray spectroscopy in scintillators where the pulse shape changes with temperature or other environmental parameters.

This supports using scintillator detectors over a wider range of environmental conditions than would ordinarily be possible.

SUMMARY

The need is addressed by a method that uses one or more sensor data, for example from temperature sensors, to adjust the signal-processing parameters to maintain the MCA performance over a wide temperature range. In particular, the method ensures a guaranteed measurement range [E_min, E_max], a near-constant conversion gain, near-optimal energy resolution, and a near-constant pile-up rejection performance. This supports precision radiation measurements with scintillator-based detectors over a wider temperature range than otherwise possible.

The need can be met by a method to stabilize the performance of a multichannel analyzer for scintillation detectors in varying temperature environments that includes at least: compensating for the temperature induced change of scintillator light pulse shape by always measuring most of the light within a scintillator pulse by varying the integration time, maintaining the pile up rejection performance when the scintillator light pulse shape changes by varying the pileup rejection parameters, and optionally, compensating for the temperature induced gain shifts of the light-to-electronics converter by adjusting the gain of the light-to-electric converter.

The need can be met by a method for performance stabilization for scintillator-based radiation detectors including at least: receiving ionizing radiation pulses into a scintillator utilizing activated crystals that generate light pulses; converting the generated light pulses into analog electrical pulses; converting the analog electrical pulses into digital pulses; and processing the digital pulses to provide a measure of the energy E received in the scintillator.

The need can be further met by the method wherein the step of processing the digital electrical pulses to provide a measure of the total pulse energy (E) received in the scintillator is computed from a sum of $y\_e[n]=(y[n]-y\_dc)$ data where y[n] is the output of the ADC n clock samples after a trigger and y_dc is a direct current baseline in the absence of a pulse.

The need can also be met by an apparatus for compensating for pulse shape variation of light generated by scintillator detectors including at least: a scintillator for receiving radiation pulses and generating light pulses; a light-to-electric pulse converter to convert the light pulses to analog electrical pulses; an optional amplifier to amplify the analog electrical pulses; an analog to digital converter to convert the analog electrical pulses to digital pulses; a pulse-processing unit to measure the energy of incoming digital pulses; an optional computational unit for managing the pulse processing unit and gathering information from the pulse processing unit.

In one embodiment this application anticipates using thallium-doped NaI as the scintillator.

BRIEF DESCRIPTION OF THE DRAWINGS

FIG. 3b shows the remaining effect after the gain shift has been corrected for.

DETAILED DESCRIPTION

This need can be met with a digital multichannel analyzer (MCA) used in conjunction with a scintillator where the scintillator pulse shape changes in response to an environmental parameter such as temperature, the MCA including at least analog to digital circuitry that converts a momentary electronic pulse amplitude from the scintillator into a digital number, a digital processing unit for performing computations on a sequence of such digital numbers, a memory device for storing operations parameters or a means to compute the parameters when needed, wherein the method used by the MCA is described below. The parameters may include the integration time, a hold-off time, pileup-rejection parameters, operation voltage for the light-to-electric converter and a digital gain factor.

Figure 1:
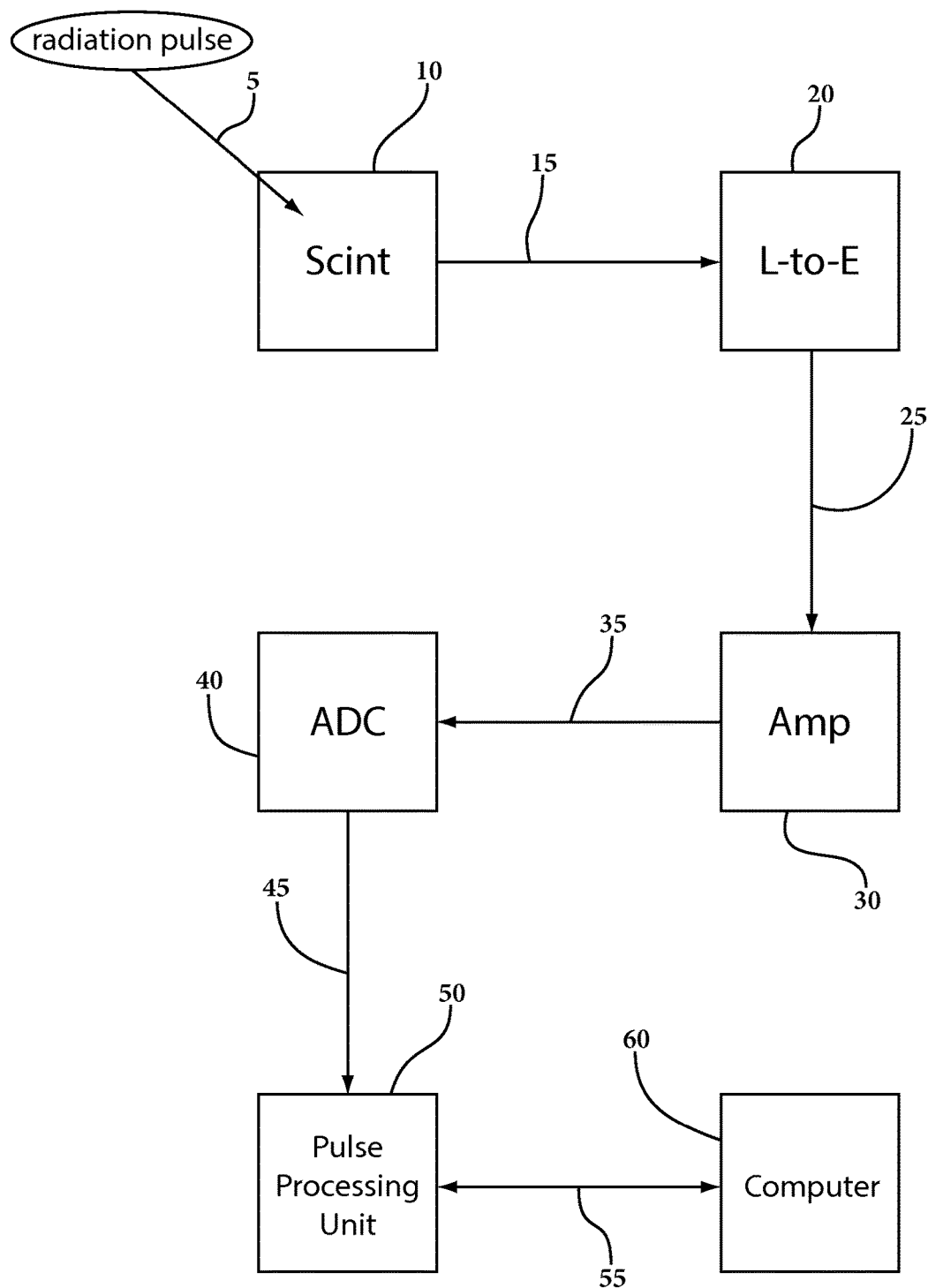
FIG. 1 illustrates an apparatus that could be used to carry out the method of this disclosure.

The device is illustrated in FIG. 1, beginning with a scintillator 10. This disclosure anticipates a number of different scintillator crystals that can be used, especially those for which the pulse shape changes with temperature, including at least activated sodium iodide or cesium iodide, or other materials that are effective for detecting gamma rays. Also anticipated are europium-doped alkaline earth halides, such as SrI2(Eu), BaI2(Eu) or mixtures thereof. In addition plastic scintillator containing 2,5-diphenyl oxazole (PPO) as the primary scintillating materials and diphenyl anthracene (DPA) as the wavelength shifter to match the emission light wavelengths to the photomultiplier tube sensitivity.

Scintillator 10 may receive a radiation pulse 5. The radiation pulse may be energetic photons >10 eV, atomic or nuclear particles such as electrons, positrons, protons, neutrons, alpha-particles, or others. When the scintillator crystal receives a radiation pulse it creates a light pulse 15 that passes to a light-to-electrical pulse converter 20. This may be a photomultiplier, SiPMT, an avalanche photodiode, or a photodiode. Device 20 then creates an electrical pulse 25 that substantially has the same amplitude vs time characteristic (pulse shape) as the original light pulse. Electrical pulse 25 passes to a series of subsystems (30, 40, 50) that represent a multichannel analyzer (MCA). Electrical pulse 25 first passes to an optional electronic amplifier 30 that amplifies electrical pulse 25 and substantially preserves the electronic pulse shape in creating an amplified electronic pulse 35. In some embodiments the amplifier 30 may be omitted. Pulse 35 passes to an analog to digital converter (ADC) 40 that converts the signal to a digital signal 45 that substantially preserves the electronic pulse shape. A pulse-processing unit 50 applies methods to recognize incoming pulses and measures their energy taking their pulse shape into account. An optional computer or microcontroller or field programmable gate array 60 issues commands and exchanges data with the pulse processing or signal processing unit 50 to retrieve pulse energy and pulse type information.

For each ionizing-radiation pulse, the MCA receives an electronic pulse proportional, or nearly proportional, to the momentary light output from the scintillator. The electronic pulse is amplified if needed and presented to the analog to digital circuitry. This creates a digital image of the electronic pulse and therefore of the momentary scintillation light pulse.

A digital pulse processing unit monitors the output from the analog to digital circuitry. In the absence of a pulse, it measures the direct current (DC) baseline (y_dc). The DC-baseline is always subtracted from the analog to digital circuitry samples (y[n]) to create the y-samples (y_e[n]). When a pulse is recognized by the trigger logic, the digital shaper is activated. The digital shaper includes a method to compute a sum of (y_e[n]) values. On trigger, the digital shaper performs the computation:

$$y\_e[n]=(y[n]-y\_dc)$$

where n is the sample count since the last trigger. A predetermined integration time number IT of y_e samples are summed to provide a measure of the energy (E) deposited in the scintillator. The digital shaper performs many of these computations in a parallel manner.

The sum over IT samples of y_e serves as a measurement of the original ionizing pulse energy. A judicious choice of the parameter IT as a function of temperature significantly improves the accuracy and energy resolution of the radiation pulse measurement, compared to prior art. To accomplish this, in one embodiment, it is assumed that a temperature sensor (not shown) measures the scintillation detector temperature and a signal processor uses the temperature to determine the various parameter values that stabilize detector performance. In another embodiment an external sensor and processor measures the temperature and determines the temperature-dependent coefficients and writes the updated coefficients to the signal processor of the scintillator.

Other operating parameters, such as the hold-off time and the pileup rejection controls may also be chosen as a function of temperature. The hold-off time avoids retriggering of the system on the falling edge of a pulse and it will typically be equal or slightly larger than the integration time (IT).

In one embodiment the pile up rejection may be governed by a single parameter: PUT=the time at which 40% of the light is collected. That parameter would then be selected as a function of temperature.

To maintain the active range of measurable radiation pulse energies, [E_min, E_max], the method would adjust the gain of the light-to-electric converter by adjusting one or more parameters. Typically, only one parameter, the operating voltage, needs to be adjusted.

The MCA delivers event data (sums of y_e samples). A plurality of event data can be graphically represented in a category plot, often called a histogram. It depicts the frequency at which the energies (E) of measured events fall into given ranges, called bins. In a typical histogram the bins have a width (dE) and the condition for an event to fall into the n'th bin is expressed as:

$$n*dE>=E<(n+1)*dE.$$

The content of a bin is a number. At the beginning of a histogram data acquisition the content of all bins is set to zero. During data acquisition, whenever an event's energy falls into a certain bin, that bin's content is incremented by 1. Over time a histogram builds up.

The performance of a radiation detection system is judged by the contents of the histogram after some acquisition time. In the case of measuring radiation from the nuclear isotope Cs-137 there will be a complex histogram.

The highest energy peak, a bell-shaped curve, will correspond to gamma-rays with energies of approximately 662 keV. Its full width at half-maximum height is an indicator of scintillator performance. The smaller the width, the better the performance.

Another important measure of the system performance is by how much the peak position in the energy histogram will drift as the temperature changes. The requirement is that any peak will drift as little as possible.

Figure 2:
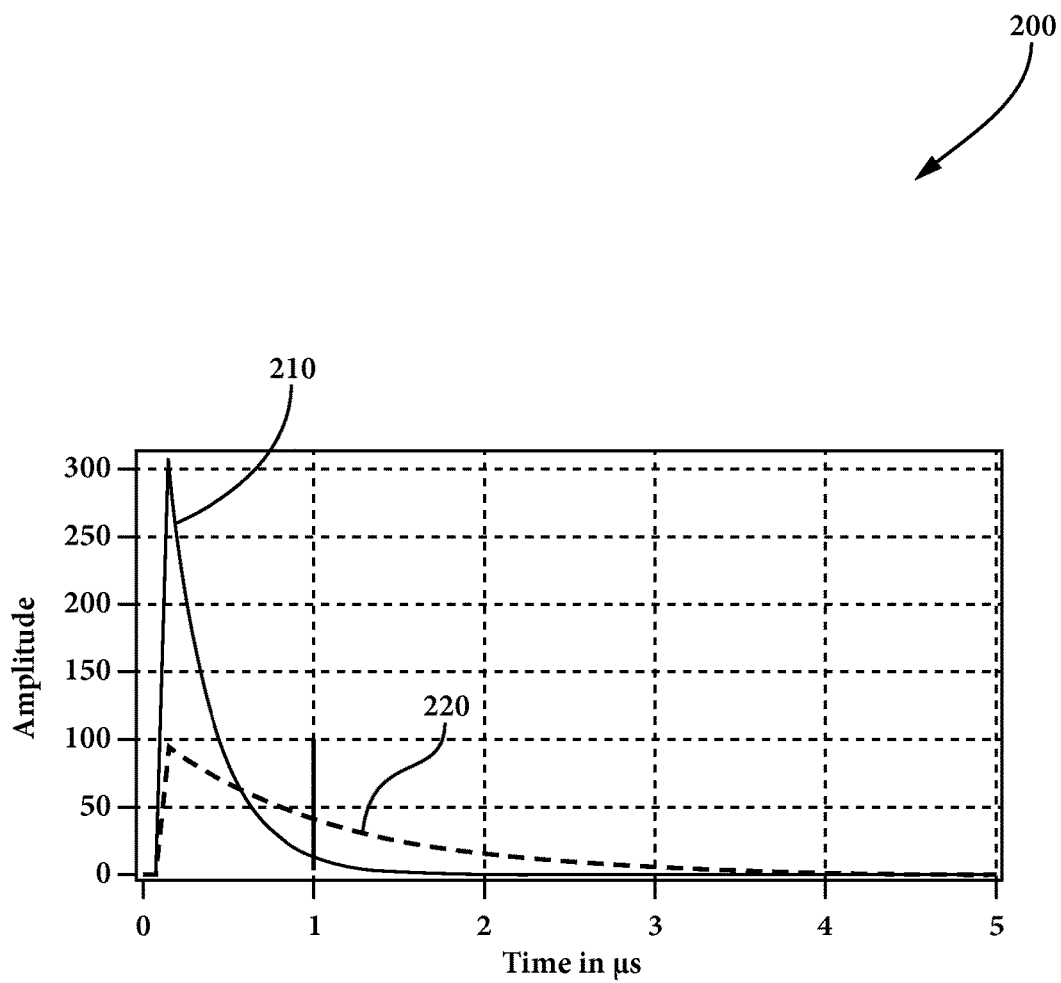
FIG. 2 illustrates scintillator pulses at low and high temperature as converted by the ADC and with the DC-offset (y_dc) subtracted.

Turning to FIG. 2, a graph shown generally as the numeral 200, shows a NaI(TI) scintillator pulse at room temperature 210 and at −20 deg C. 220. The vertical stroke at 1.0 micro-seconds may indicate the fixed integration time. The pulse will be summed or integrated from 0 to this limit. Any pulse fraction beyond this limit is ignored. Hence, information is lost for the slow pulse. This creates an apparent gain shift and reduces the accuracy of the energy measurement. By careful calibration work, the gain can be adjusted as a function of temperature to overcome this.

Figure 3A:
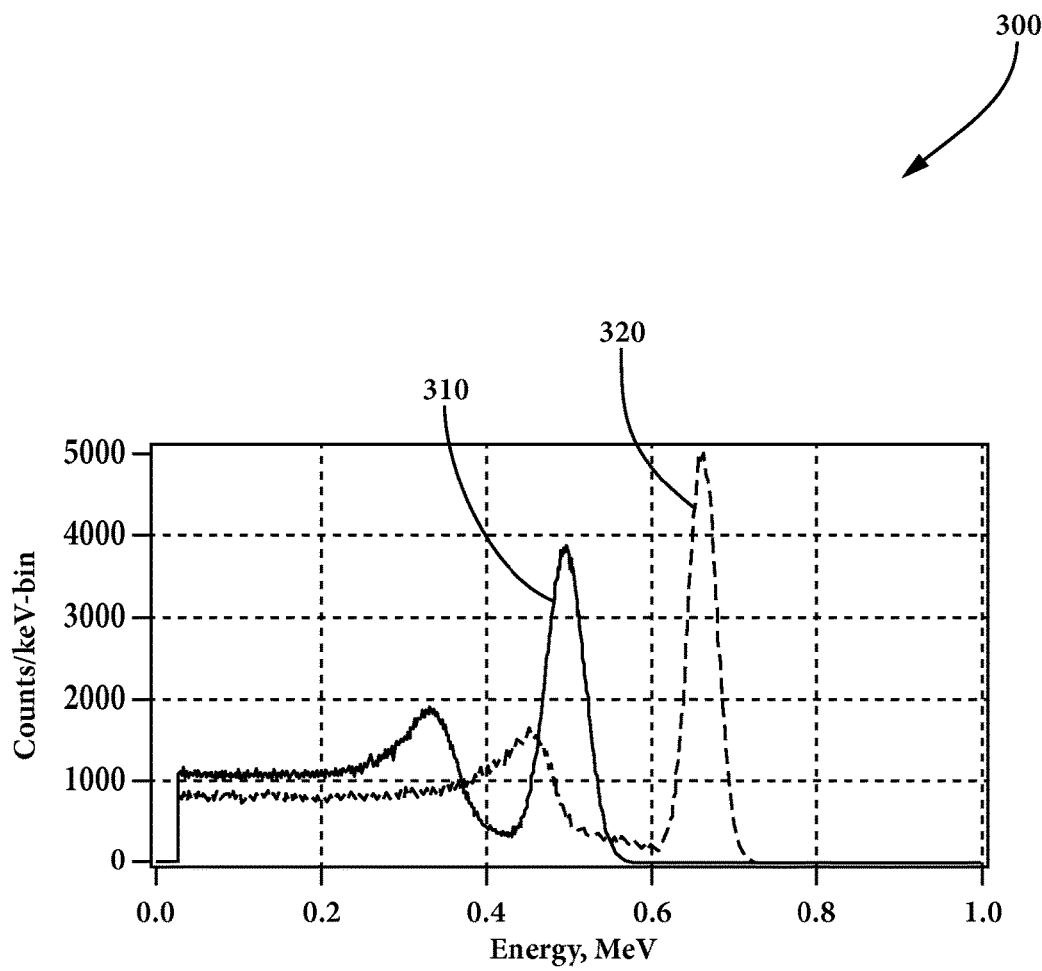
FIG. 3a illustrates the impact of pulse lengthening on gain and energy resolution when measuring a Cs-137 radioactive source if the integration time IT is not adjusted with temperature.

Turning now to FIG. 3a, shown generally as the numeral 300, an energy spectrum of Cs-137 from a Na(TI) detector calibrated at room temperature 310. The full-energy peak at 0.662 keV has an energy resolution of 6.5% fwhm (full width at half maximum). The solid line 320 shows the energy spectrum obtained from the same detector at −20 deg C. while keeping the integration time constant and accounting for the gain drift of the photomultiplier and the electronics. Due to the lengthening of the pulse, only a part of it is being integrated, leading to an apparent loss of gain and a poorer energy resolution (8.5% fwhm for the full-energy peak).

Figure 3B:
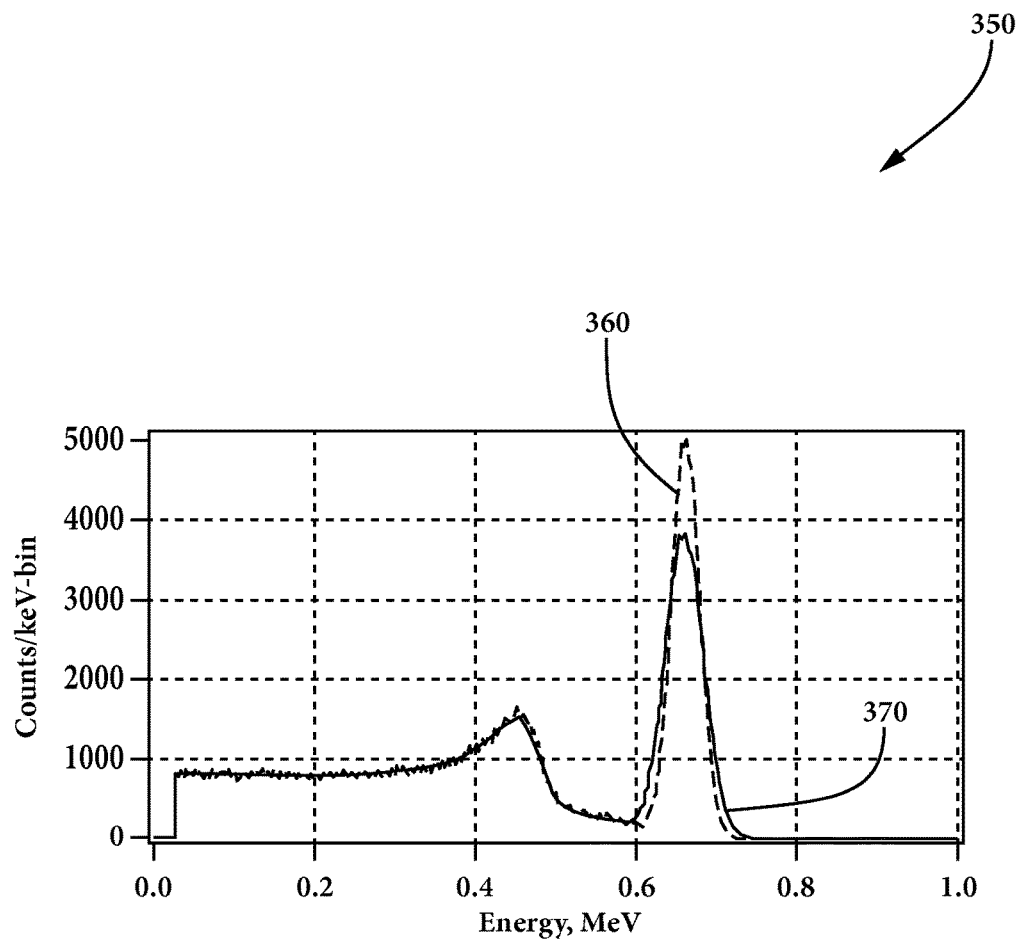

In FIG. 3b, we make up for the apparent gain-loss of the lengthened pulses by applying a separate gain factor, so the peaks measured at cold 370 and room temperature 360 overlap. This gain factor can be developed by experimentation to be applied for any temperature. It can then be used to adjust the gain of the light-to electric converter according to an experimentally predetermined function or based on a look-up table of gain versus temperature. But still, the two histograms are quite different, because of the poorer energy resolution at −20 deg C.

There are many algorithms for radio-isotope identification in use by industrial and military operators. All algorithms are carefully tuned and tested for a particular detector type and size. A change of energy resolution is highly undesirable. Hence, the integration (IT) time needs to be adjusted as a function of temperature.

As previously discussed, the second impact a changing pulse shape has is on the accuracy of the energy measurement. In practice the shaping time or integration time is chosen such as to use about 90% of the light from the scintillation pulse for the measurement of the energy. Using less will deteriorate the precision of the measurement. If the scintillation pulses lengthen, for example due to a temperature change, they may become too long for the given operating parameters of the MCA. As a result, the MCA will measure energy values that are systematically smaller than the correct values. It will also lose accuracy of measurement (energy resolution) as it samples less than 90% of the scintillation light. The solution is to adjust the integration time as a function of temperature so that a longer integration time is used at lower temperatures. This change in integration time can be studied experimentally, so that a required integration time as a function of temperature is known and can be applied automatically as a function of the temperature.

Figure 4A:
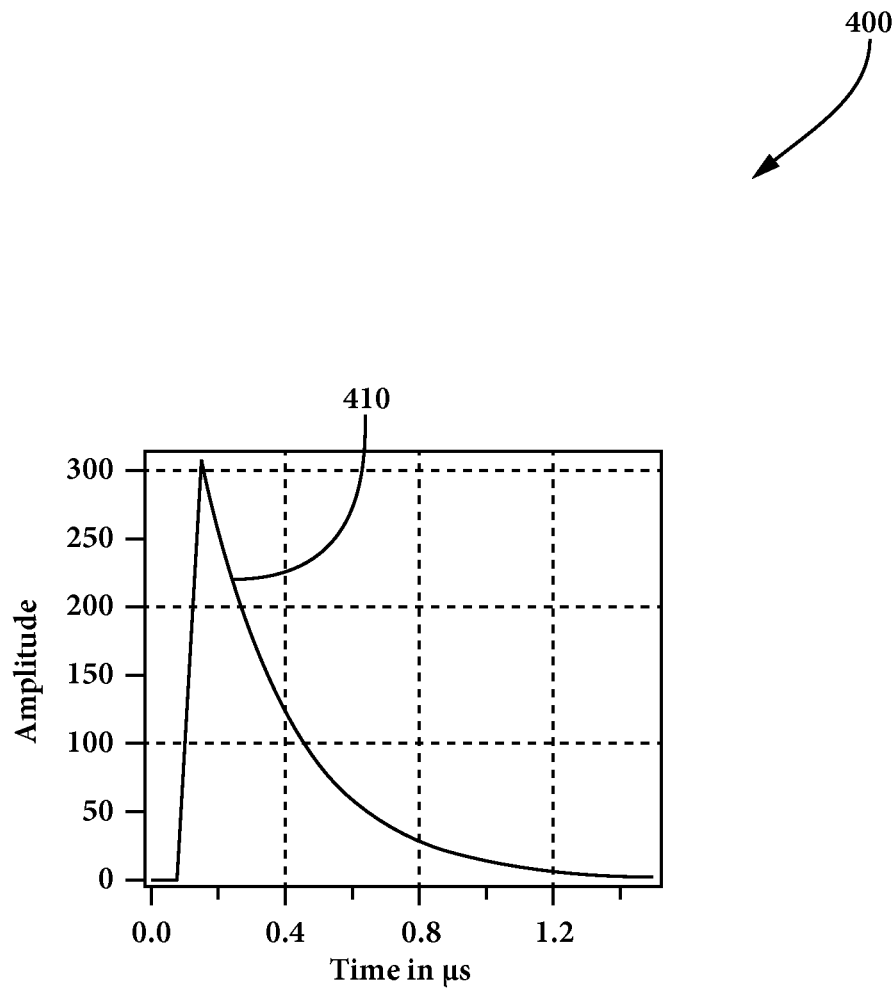
FIG. 4a shows a normal NaI-scintillator pulse.

In FIGS. 4a through 4d the concept of pile up rejection is illustrated. FIG. 4a, shown generally by the numeral 400, is the shape of a single isolated NaI(TI) light pulse at room temperature.

Figure 4B:
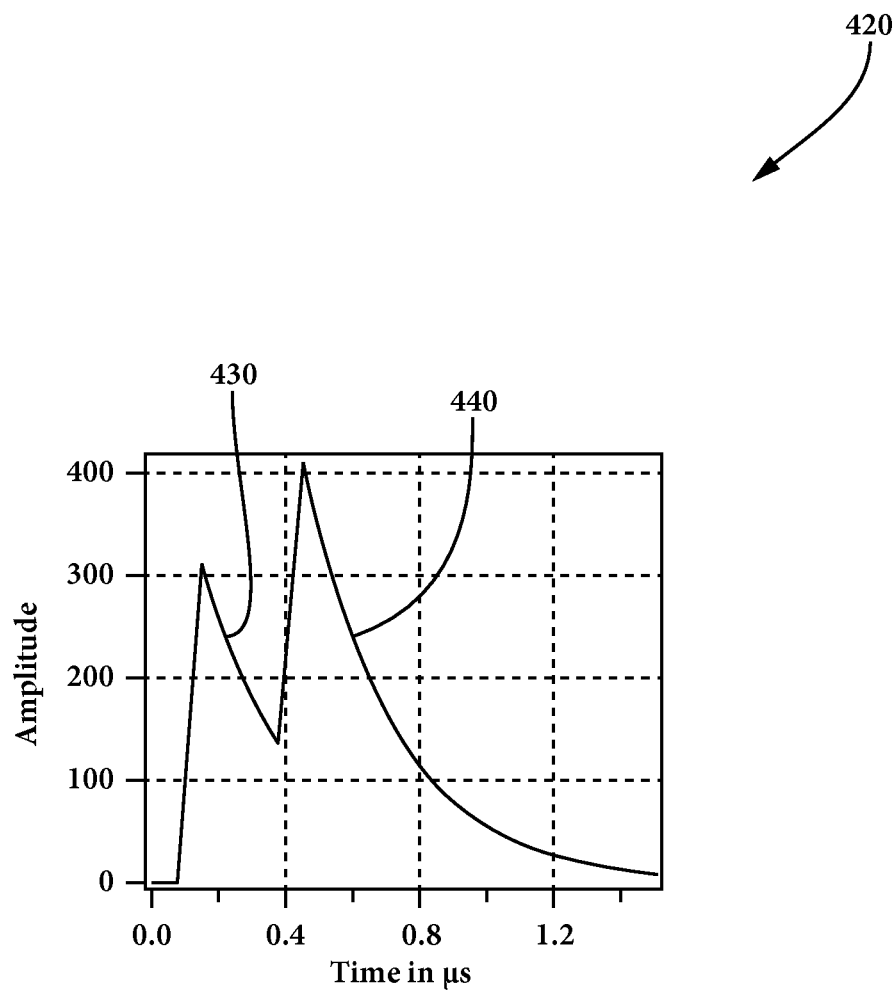
FIG. 4b shows two pulses occurring too close together—a pile up.

In FIG. 4b is an illustration for the case of 2 close-by pulses at room temperature. They occur within 0.40 microseconds of each other. The second pulse 440 piles on top of the tail end of the previous pulse 430. They occur too close together (less than the integration time of 1.2 microsecond) and therefore cannot be measured accurately. Hence, they must be rejected as "piled up".

Figure 4C:
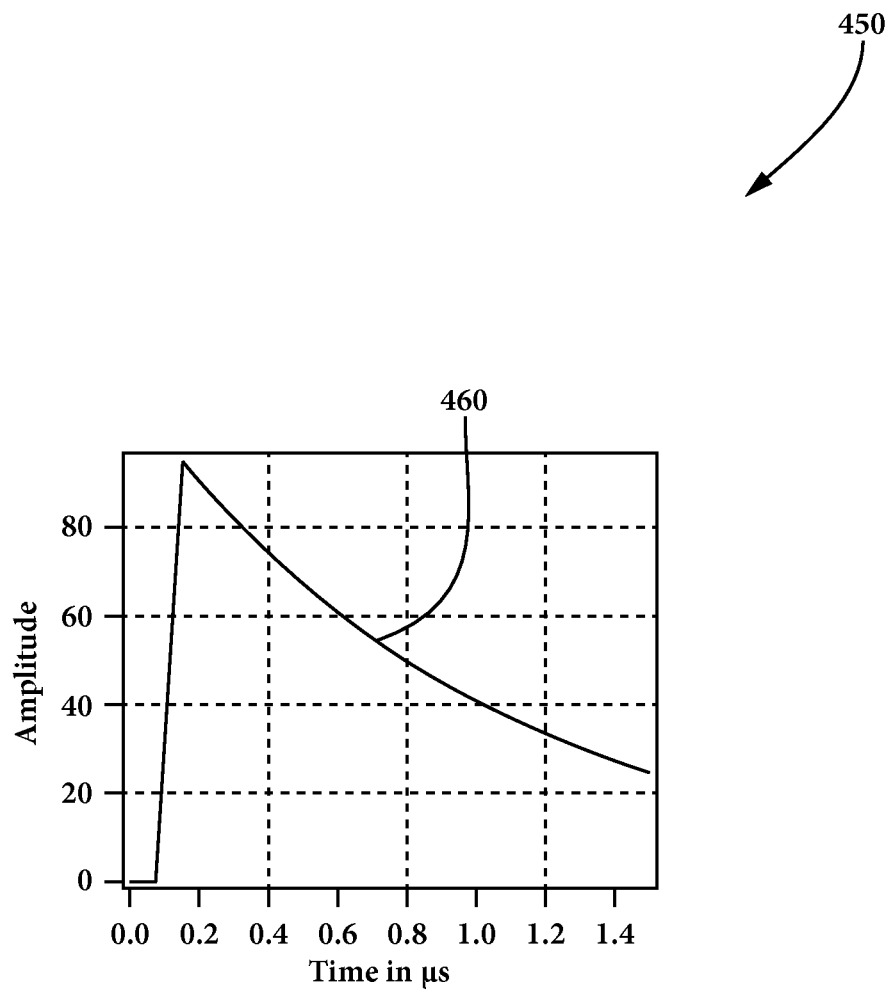
FIG. 4c shows a slowed-down NaI-pulse at low temperature.

In FIG. 4c, shown generally by the numeral 450, a NaI(TI) pulse at −20 deg C. is illustrated. It is much slower than a room-temperature pulse 410 of FIG. 4a and does not return to near-baseline values at 1 microsecond as the room temperature pulse does.

Figure 4D:
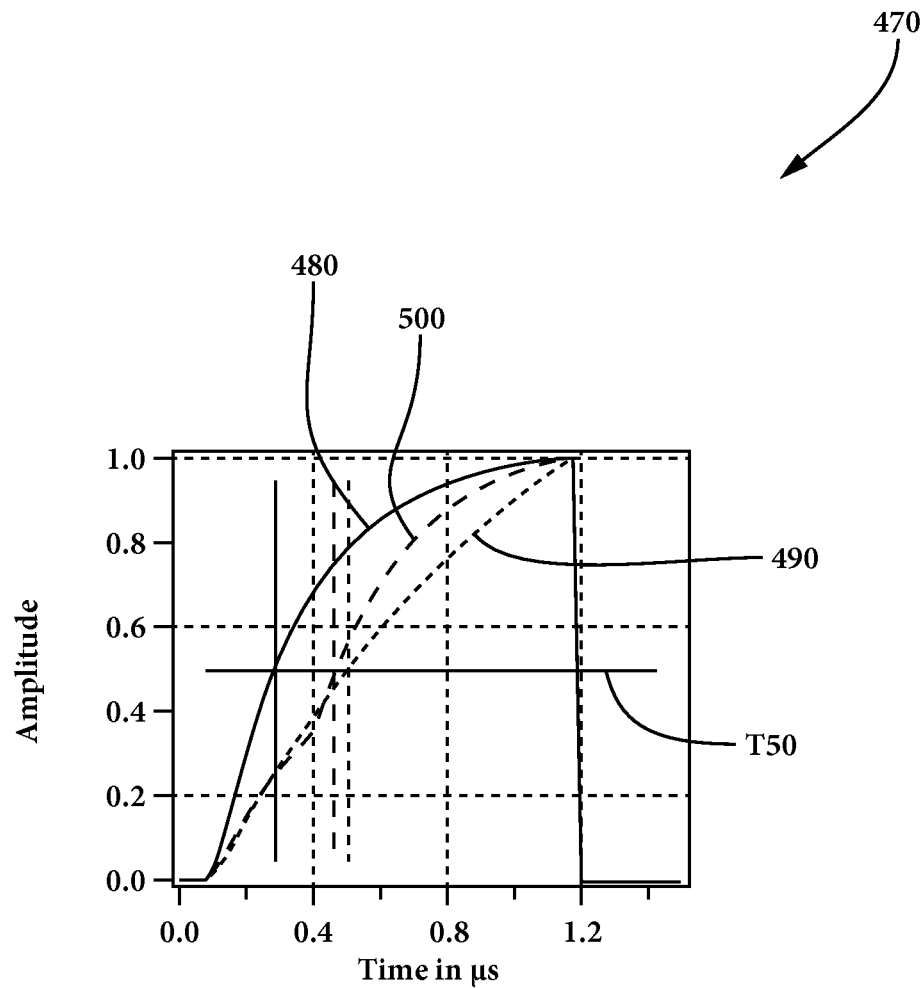
FIG. 4d shows the integrated pulses from a time shortly before the trigger to an integration time of 1.2 microseconds.

FIG. 4d, shown generally as the numeral 470 illustrates an overall algorithm to determine pile up. Plotted are time integrals over the pulses shown in FIGS. 4a, 4b and 4c. For example the time integral of the single room temperature pulse 410 of FIG. 4a is shown as the integral curve 480. The time integral of the single cold temperature pulse 460 of FIG. 4c is shown as the integral curve 490. And curve 500 represents the time integral of the two piled up pulses of FIG. 4b. The time integrals have been normalized to unity at 1.2 microseconds. We use the time (T50) at which the integral crosses the 50% threshold as an indicator of pulse pile up. For a room temperature NaI(TI) pulse the time is at 0.28 microsecond, represented by the vertical line at 0.28 microseconds. For the piled-up pulse of FIG. 4b it is 0.43 microsecond. For the slow pulse shown in FIG. 4c it is 0.46 microsecond.

A simple algorithm may measure T50 for each recognized pulse and accept pulses for which T50<0.35 microsecond and reject pulses for which T50>=0.35 microsecond as "piled-up", but such an algorithm would incorrectly reject the slow pulses as piled up. Hence it is necessary to adjust the integration time to the expected pulse length to maintain a valid pile-up rejection. In addition, one or more pile up parameters may have to be adjusted in response. For example, the pile up inspection time PUT covers a certain fraction of the light pulse energy. That fraction may become temperature dependent.

FIGS. 4a, 4b, 4c, 4d illustrate the concept of pile up recognition. PUT<IT represents the time by which 40% of the light in the pulse should be accumulated for a regular pulse. Pileup may be recognized if less than 40% of the light is collected during the time PUT compared to the integration time IT.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method to stabilize the energy resolution and pile up rejection capability of a scintillator-based radiation detector in environments where the temperature varies with time using a multichannel analyzer that measures light pulses using computer readable program codes recorded in a non-transitory computer readable media wherein the program codes:
   a) first measure and record the scintillator temperature from a temperature sensor,
   b) then set the integration time of the multichannel analyzer based on experimentally predetermined integration times as a function of temperature; and
   c) then set the pile up rejection parameters of the multichannel analyzer to maintain a desired pulse rejection performance based on experimentally predetermined pile up rejection parameters values as a function of temperature;
   d) wherein these steps keep the energy resolution and pile up rejection capability of the multi-channel analyzer constant over a temperature range in which the scintillator pulse shape changes considerably.

2. The method of claim 1 further comprising compensating for temperature induced gain shifts of a light-to-electric converter that receives the light pulses by adjusting the gain of the light-to-electric converter.

3. The method of claim 2 wherein compensating for the temperature induced gain shifts of the light-to-electric converter by adjusting a gain of the light-to-electric converter is performed by adjusting the gain of the light-to-electric converter according to an experimentally predetermined function.

4. The method of claim 2 wherein the light-to-electric converter gain is adjusted by changing the operating voltage of the light-to-electric converter.

5. The method of claim 1 wherein setting the integration time of the multichannel analyzer based on experimentally predetermined integration times as a function of temperature is done by varying the integration time of the multichannel analyzer as a function of temperature according to an experimentally predetermined function.

6. The method of claim 1 wherein setting the integration time of the multichannel analyzer based on experimentally predetermined integration times as a function of temperature is done by use of a look up table of integration time versus temperature.

7. The method of claim 1 wherein setting the pile up rejection parameters of the multichannel analyzer to maintain a desired pulse rejection performance based on experimentally predetermined pile up rejection parameters as a function of temperature is done by setting pile up rejection parameters that recognize a pile up if less than a selected percentage of the light is collected during the pile up time compared to the integration time of the multichannel analyzer.

8. The method of claim 1 wherein setting the pile up rejection parameters of the multichannel analyzer to maintain a desired pulse rejection performance based on experimentally predetermined pile up rejection values as a function of temperature to is done by use of a look up table for each pile up rejection parameter versus temperature.

9. The method of claim 1 wherein where software on an external sensor and processor measures the scintillation detector temperature, determines temperature-dependent coefficients, and writes the updated coefficients to a signal processor of the scintillator.

10. The method of claim 1 wherein a signal processor of the scintillator uses the measured temperature to set parameter values that stabilize detector performance.

* * * * *